(12) United States Patent
Schapire et al.

(10) Patent No.: US 6,453,307 B1
(45) Date of Patent: Sep. 17, 2002

(54) METHOD AND APPARATUS FOR MULTI-CLASS, MULTI-LABEL INFORMATION CATEGORIZATION

(75) Inventors: Robert E. Schapire, Maplewood, NJ (US); Yoram Singer, New Providence, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/253,692

(22) Filed: Feb. 22, 1999

Related U.S. Application Data
(60) Provisional application No. 60/076,809, filed on Mar. 3, 1998.

(51) Int. Cl.[7] ................................................. G06F 15/18
(52) U.S. Cl. ............................. 706/12; 706/20; 706/21
(58) Field of Search ............................. 706/12, 21, 20

(56) References Cited

U.S. PATENT DOCUMENTS

| | | | |
|---|---|---|---|
| 5,613,037 A | 3/1997 | Sukkar | 704/256 |
| 5,710,864 A | 1/1998 | Juang et al. | 704/238 |
| 5,819,247 A | 10/1998 | Freund et al. | 706/25 |
| 5,912,986 A | 6/1999 | Shustorovich | 382/156 |

OTHER PUBLICATIONS

Neti et al, "Word–Based Confidence Measures as a Guide for Stack Search in Speech Recognition", IEEE International Conference on Acoustics, Speech, and signal processing, Apr. 1997.*

* cited by examiner

Primary Examiner—George B. Davis
(74) Attorney, Agent, or Firm—Kenyon & Kenyon

(57) ABSTRACT

A method and apparatus are provided for multi-class, mutli-label information categorization. A weight is assigned to each information sample in a training set, the training set containing a plurality of information samples, such as text documents, and associated labels. A base hypothesis is determined to predict which labels are associated with a given information sample. The base hypothesis predicts whether or not each label is associated with information sample or predicts the likelihood that each label is associated with the information sample. In the case of a document, the base hypothesis evaluates words in each document to determine one or more words that predict the associated labels. When a base hypothesis is determined, the weight assigned to each information sample in the training set is modified based on the base hypothesis predictions.

24 Claims, 2 Drawing Sheets

METHOD AND APPARATUS FOR MULTI-CLASS, MULTI-LABEL INFORMATION CATEGORIZATION

CROSS-REFERENCE TO RELATED APPLICATIONS

This application claims the benefit of U.S. Provisional Patent Application Serial No. 60/076,809 entitled "BoosTexter: A System for Multiclass Multi-Label Text Categorization" and filed Mar. 3, 1998.

FIELD OF THE INVENTION

The present invention relates to information categorization. More particularly, the present invention relates to multi-class, multi-label information categorization.

BACKGROUND OF THE INVENTION

Information categorization is the process of classifying information samples into categories or classes. By way of example, text categorization is the process of classifying a text document, such as into a "politics," a "business" or a "sports" category, based on the document's content. When used in connection with a speech recognition device, information categorization can be used, for example, by a telephone network provider to automatically determine the purpose of a telephone call received from a customer. If the customer says, "I would like to charge this call to my credit card," the system could automatically recognize that this is a calling-card request and process the call accordingly. Note that the information is categorized "automatically" in that human input is not required to make the decision. Although this example involves a speech-categorization problem, a text-based system can be used if the customer's spoken message is passed through a speech recognizer.

It is known that an information categorization algorithm can "learn," using information samples, to perform text-categorization tasks, such as the ones described above. For example, a document might be classified as either "relevant" or "not relevant" with respect to a pre-determined topic. Many sources of textual data, such as Internet news feed, electronic mail and digital libraries, include different topics, or classes, and therefore pose a "multi-class" categorization problem.

Moreover, in multi-class problems, a document may be relevant to several different classes. For example, a news article may be relevant to "politics" and "business." Telephone call-types are also not mutually exclusive (i.e., a call can be both "collect" and "person-to-person").

One approach to multi-class, multi-label information categorization is to break the task into disjoint binary categorization problems, one for each class. To classify a new information sample, such as a document, all the binary classifiers are applied and the predications are combined into a single decision. The end result can be, for example, a list of which classes the document probably belongs to, or a ranking of possible classes. Such an approach, however, can ignore any correlation that might exist between different classes. As a result, the information categorization is less effective and/or efficient than may be desired.

In view of the foregoing, it can be appreciated that a substantial need exists for an information categorization method and apparatus that is directed to the multi-class, multi-label problem and addresses the problems discussed above.

SUMMARY OF THE INVENTION

The disadvantages of the art are alleviated to a great extent by a method and apparatus for multi-class, multi-label information categorization. A weight is assigned to each information sample in a training set, the training set containing a plurality of information samples, such as text documents, and associated labels. A base hypothesis is determined to predict which labels are associated with a given information sample. The base hypothesis may predict whether or not each label is associated with the information sample, or may predict the likelihood that each label is associated with the information sample. In the case of a document, the base hypothesis may evaluate words in each document to determine one or more words that predict the associated labels.

When a base hypothesis is determined, the weight assigned to each information sample in the training set is modified based on the base hypothesis predictions. For example, the relative weight assigned to an information sample may be decreased if the labels associated with that information sample are correctly predicted by the base hypothesis. These actions are repeated to generate a number of base hypotheses which are combined to create a combined hypothesis. An un-categorized information sample can then be categorized with one or more labels in accordance with the combined hypothesis. Such categorization may include predicting which labels are associated with each information sample or ranking possible labels associated with each information sample.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
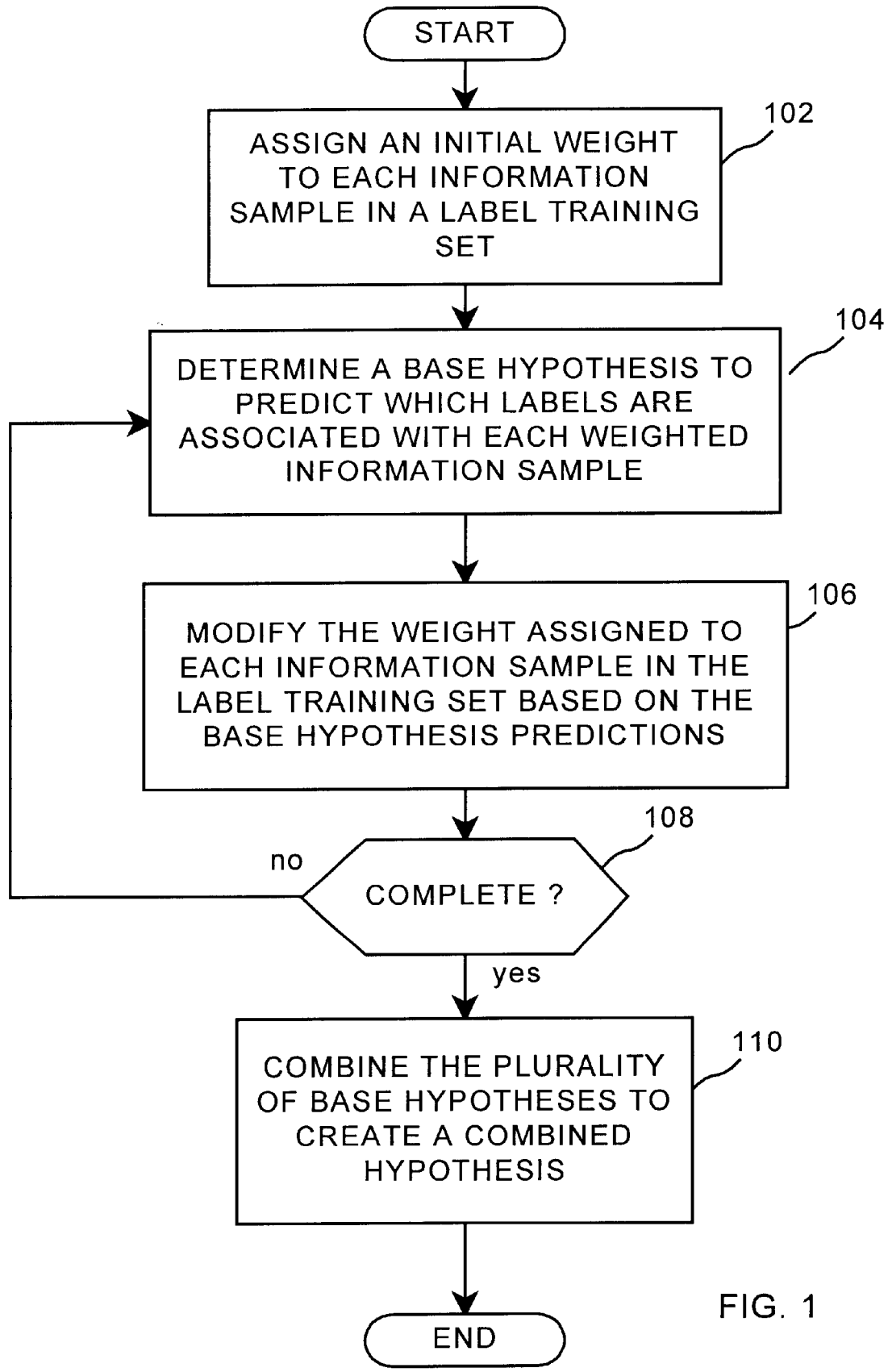
FIG. 1 is a flow diagram of a method for information categorization according to an embodiment of the present invention.

The present invention is directed to multi-class, multi-label information categorization. According to an embodiment of the present invention, an algorithm learns from examples to perform multi-class text and speech categorization tasks. The standard notion of classification is extended by allowing each instance to be associated with multiple labels.

Rather than breaking a multi-class problem into separate binary problems, an embodiment of the present invention uses the "AdaBoost" algorithm disclosed in Yoav Freund and Robert E. Schapire, "A Decision-Theoretic Generalization of On-Line Learning and an Application to Boosting," Journal of Computer and System Sciences, 55(1):119–139 (August 1997) and U.S. Pat. No. 5,819,247, the entire contents of which are hereby incorporated by reference, such that information categorization algorithms can represent and handle sets of labels. The AdaBoost algorithm has been studied and shown to perform standard machine-learning tasks.

Several embodiments of the present invention use extensions of AdaBoost that handle multi-label problems. According to one embodiment, the goal of the learning algorithm is to predict all—and only all—of the correct labels. Thus, the classifier is evaluated in terms of its ability to predict a good approximation of the set of labels associated with a given document. According to another embodiment, the goal is to design a classifier that "ranks" the labels such that the correct labels will receive the highest ranks.

By way of example only, consider the problem of categorizing a text document representing a news story into one or more of "politics," "business" and "sports." A sample of several thousand news stories that have been manually classified can be used as the training set. Each sample in the training set can be assigned a set of three weights, one for each possible class. Initially, the weight for each class, and the weights for all training set documents, may be set to equal values. For example, every training set document may be assigned a set of weights as follows: "politics—0.33;" "business—0.33;" and "sports—0.33."

Using these sets of weights, a base hypothesis is determined that predicts which labels are associated with a given training set document. For example, every word that appears in any training set document can be evaluated to see how well that word predicts the labels associated with the training set documents. The word "baseball" might predict that a document (i) is not associated with "politics" or "business" and (ii) is associated with "sports." The word "Washington," on the other hand, may be less useful when making such a prediction. In this case, the base hypothesis may be "if the word 'baseball' appears in the document, the document has the label 'sports' and does not have the labels 'politics' and business.'"

The set of weights assigned to each document in the training set is then modified. The set of weights for a document that was correctly predicted by the base hypothesis may be reduced, while the set of weights for a document that was not correctly predicted by the base hypothesis may be increased. For example, a document that had the word "baseball" and was correctly predicted to be in "sports," and not in "politics" or "business," may now be assigned a set of weights as follows: "politics—0.20;" "business—0.20;" and "sports—0.20." Another document that had the word "baseball" but should have been in both "politics" and "business," and not in "sports," may now be assigned a set of weights as follows: "politics—0.40;" "business—0.40;" and "sports—0.40." Of course, a document for which the base hypothesis correctly predicted some labels and incorrectly predicted other labels can have some weights increased and other weights decreased. According to another embodiment of the present invention, a training set document may be assigned only a single weight as opposed to a set of weights.

The modified sets of weights are used to determine a new base hypothesis to predict which labels are associated with a given training set document. Because different weights are used, the new base hypothesis can be different from the initial hypothesis. Using the example above, the weights assigned to documents that were correctly predicted with the word "baseball" have been reduced, and these documents are therefore given less importance when evaluating the accuracy of a hypothesis. In this way, the system concentrates on those documents that have been less successfully categorized with the previous hypotheses. These steps are repeated a number of times to generate a number of "base" hypotheses that are combined into a single, more accurate, "combined" hypothesis. The combined hypothesis is then used to determine labels for unclassified new stories.

This example illustrates only one embodiment of the present invention, and many different variations are possible. For example, boosting algorithms related to four embodiments of the present invention will be described in detail to illustrate some of the implementation issues that arise in multi-label text categorization. It will be clear to those skilled in the art, however, that other boosting algorithms may be used instead in accordance with these and other embodiments of the present invention.

Some embodiments of the present invention may use $\theta(mk)$ space and time per boosting iteration, where m is the number of training documents and k is the number of different classes. Although a number of evaluation measures have shown that information categorization according to embodiments of the present invention is generally better than known algorithms, sometimes by a wide margin, there may be a price for this performance. Namely, a boosting algorithm according to some embodiments of the present invention may be an order of magnitude slower to train as compared with other information categorization algorithms.

Multi-Label Text Categorization—General Notations

Let X denote the domain of possible text documents and let Y be a finite set of labels or classes. The size of Y is denoted by $k=|Y|$. In the traditional text categorization setting, each document $x \in X$ is assigned a single class $y \in Y$. The typical goal is to find a classifier $H: X \to Y$ which minimizes the probability that $y \neq H(x)$ on a newly observed example (x, y). Note that the single-label case is therefore a special case in which $|Y|=1$ for all observations.

In the multi-label case, each document $x \in X$ may be assigned multiple labels in Y. For example, in a multi-class news filtering problems in which the possible classes are "politics," "business," and "sports," a document may belong to both "politics" and "business." Thus, a labeled example is a pair (x, Y) where $Y \subseteq Y$ is the set of labels assigned to x.

For $Y \subseteq Y$, let us define $Y\{l\}$ for $l \in Y$ to be:

$$Y\{l\} = \begin{cases} +1 & \text{if } l \in Y \\ -1 & \text{if } l \notin Y. \end{cases}$$

Some classifiers produce a "ranking" of the possible labels for a given document, with the hope that the appropriate labels will appear at the top of the ranking. To be more formal, the goal of such learning is to produce a function of the form $f: X \times Y \to \mathbb{R}$ with the interpretation that, for a given instance x, the labels in Y should be ordered according to $f(x, \cdot)$. That is, a label $l_1$ is considered to be ranked higher than $l_2$ if $f(x, l_1) > f(x, l_2)$. If Y is the associated label set for x, then a successful learning algorithm will tend to rank labels in Y higher than those not in Y.

To simplify the notation, for any predicate $\pi$, let $[[\pi]]$ be 1 if $\pi$ holds, and 0 otherwise.

Boosting Algorithms for Multi-Label Multi-Class Problems

Two new boosting algorithms for multi-class, multi-label information classification will now be described, and four versions of these algorithms will be discussed in connection with the problem of text categorization. Note that similar algorithms may also be used in connection with other multi-class, multi-label information classification problems.

The purpose of "boosting" is to find a highly accurate classification rule by combining many weak or "base hypotheses," each of which may be only moderately accurate. Access to a separate procedure called the "weak learner," or "weak learning algorithm," for computing the weak hypotheses is assumed. A weak learner may simply, for example, examine every word in all text samples to determine which word is the most accurate label predictor.

Referring now in detail to the drawings wherein like parts are designated by like reference numerals throughout, there is illustrated in FIG. 1 a flow diagram of a method for information categorization according to an embodiment of the present invention. As shown in FIG. 1, an initial weight, or set of weights, is assigned to each information sample in a training set (step 102).

The boosting algorithm finds a set of base or weak hypotheses by calling the weak learner repeatedly in a series of rounds. In particular, the weak learner determines a base hypotheses, using the weight or weights assigned to each information sample (step 104). The weight or weights assigned to each information samples is then modified based on the base hypothesis prediction for that information sample (step 106). This is repeated a number of times (steps 108) to create a plurality of base hypotheses. After the base hypotheses are complete, the base hypotheses are combined into a single rule called the "final" or "combined" hypothesis (step 110).

Figure 2:
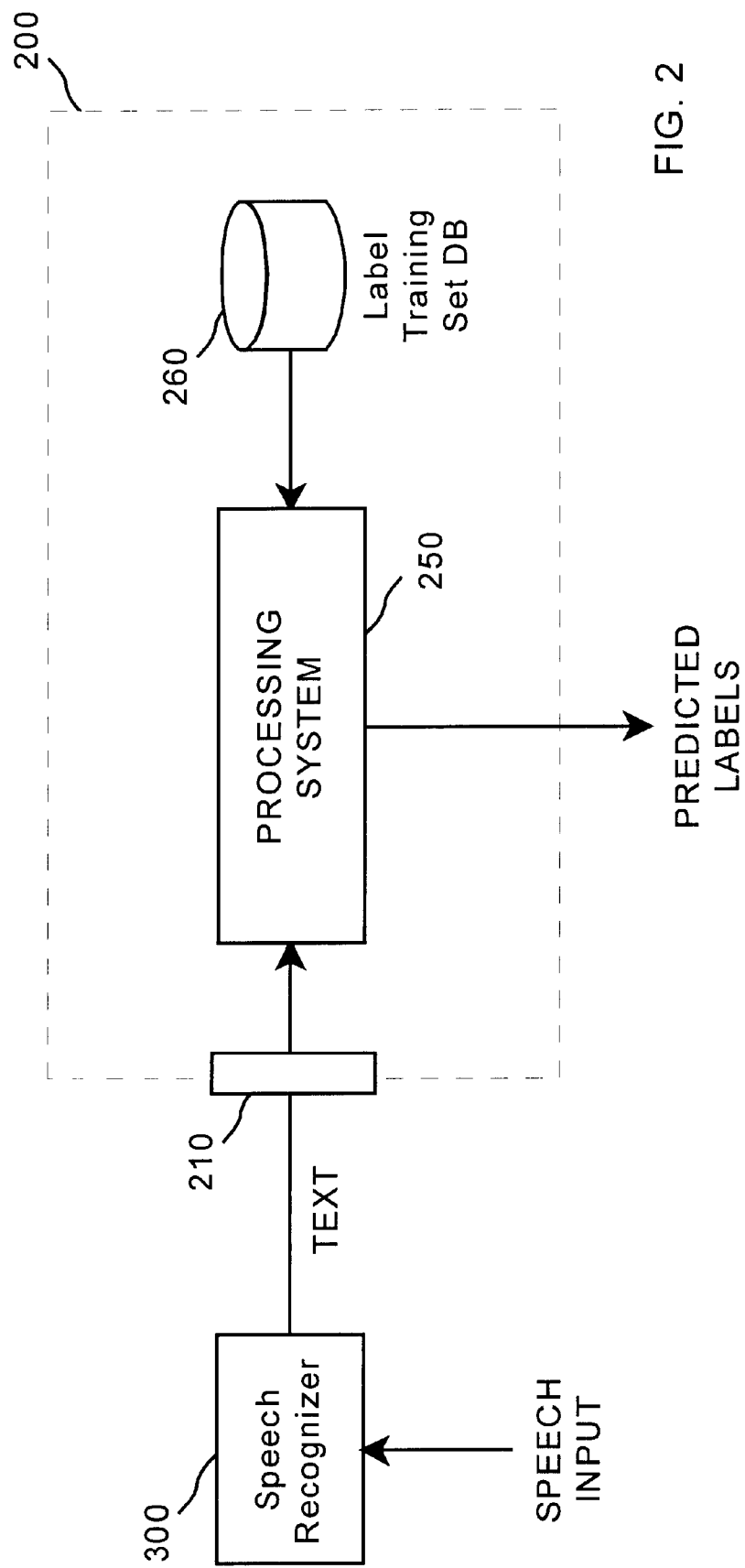
FIG. 2 is a block diagram of an apparatus that categorizes information according to an embodiment of the present invention.

FIG. 2 is a block diagram of an apparatus 200 that categorizes information according to an embodiment of the present invention. That apparatus 200 includes a processing system 250 that uses information stored in a training set database 260 to generate a combined hypothesis as described with respect to FIG. 1. A speech input may be converted to text, such as by a speech recognizer 300, and input to the processing system 250 through a communication port 210. The processing system can then use the combined hypothesis to output the categorized information, such as the labels associated with a text document. Such information may be used, for example, to automatically process a telephone call.

Note the apparatus 200 is shown in FIG. 2 performs both the learning and information categorization functions. Such an arrangement is provided merely as an illustration of an embodiment of the present invention. It will be clear to those skilled in the art, however, that other systems may be used instead. For example, one device may perform the learning function and generate a combined hypothesis, while one or more other devices perform the information categorization function, using that combined hypothesis.

According to one embodiment of the present invention, which may be used, for example, with a simple version of AdaBoost for single-label classification, the boosting algorithm maintains a set of importance weights over training examples. These weights are used by the weak learning algorithm, whose goal is to find a weak hypothesis with moderately low error with respect to these weights. Thus, the boosting algorithm can use these weights to force the weak learner to concentrate on the examples which are hardest to classify.

For multi-class, multi-label problems, a set of weights may be maintained over training examples and labels according to another embodiment of the present invention. As boosting progresses, training examples, and corresponding labels, that are hard to predict correctly get incrementally higher weights while examples and labels that are easy to classify get lower weights. For instance, with respect to a text document classification problem, it might be easy to classify a document as a "politics" item but hard to determine whether or not it belongs to the "business" section. In this case, as boosting progresses the weight of the "politics" label may decrease while the weight of the "business" label increases. The intended effect is to force the weak learning algorithm to concentrate on examples and labels that will be most beneficial to the overall goal of finding a highly accurate classification rule.

AdaBoost.MH

Let S be a sequence of training examples $\langle (x_1, Y_1), \ldots, (x_m, Y_m) \rangle$ where each instance $x_i \in X$ and each $Y_i \subseteq Y$. The first boosting algorithm for multi-class multi-label classification problems according to an embodiment of the present invention called "AdaBoost.MH," is as follows:

Given: $(x_1, Y_1), \ldots, (x_m, Y_m)$ where $x_i Y X$ and $Y_i \subseteq Y$

Initialize $D_1(i, l) = 1/(mk)$

For $t = 1, \ldots, T$:

Pass distribution $D_t$ to weak learner

Get weak hypothesis $h_t : X \times Y \to \mathbb{R}$

Choose $a_t \in \mathbb{R}$

Update:

$$D_{t+1}(i, l) = \frac{D_t(i, l) \exp(-\alpha_t Y_i\{l\} h_t(x_i, l))}{Z_t}$$

where $Z_t$ is a normalization factor, chosen so that $D_{t+1}$ will be a distribution. The final hypothesis is output as follows:

$$f(x, l) = \sum_{t=1}^{T} \alpha_t h_t(x, l)$$

This AdaBoost.MH algorithm maintains a set of weights as a distribution $D_t$ over examples and labels. Initially, this distribution is uniform. On each round t, the distribution $D_t$, together with the training sequence S, is passed to the weak learner which computes a weak hypothesis $h_t$. The output of the weak learner is a hypothesis h: $X \times Y \to \mathbb{R}$. The sign of h(x, l) represents a prediction as to whether the label l is, or is not, assigned to x (i.e., a prediction of the value of $Y\{l\}$). The magnitude of the prediction $|h(x, l)|$ is interpreted as a measure of "confidence" in the prediction. The precise goal of the weak learner is described below, as are examples of weak learners.

A parameter $\alpha_t$ is then chosen and the distribution $D_t$ is updated. In the typical case that $\alpha_t$ is positive, the distribution $D_t$ is updated in a manner that increases the weight of example-label pairs which are misclassified by $h_t$ (i.e., for which $Y_i\{l\}$ and $h_t(x_i, l)$ differ in sign). The final hypothesis ranks documents using a weighted vote of the weak hypotheses.

This algorithm is derived using a natural decomposition of the multi-class, multi-label problem into k orthogonal binary classification problems. That is, each observed label set Y may be thought of as specifying k binary labels (depending on whether a label l is or is not included in Y), and binary-prediction boosting algorithms can then be applied.

This view of the algorithm leads to a simple analysis. Specifically, there is a bound on the empirical "Hamming loss" of this algorithm, i.e., the fraction of examples i and labels l for which the sign of $f(x_i, l)$ differs from $Y_i\{l\}$. The Hamming loss of this algorithm is at most:

$$\prod_{t=1}^{T} Z_t$$

where $Z_t$ is the normalization factor computed on round t. This upper bound can be used in guiding both the choice of $\alpha_t$ and the design of the weak learning algorithm. Together, these choices should be geared on each round t toward the minimization of:

$$Z_t = \sum_{i=1}^{m} \sum_{l \in Y} D_t(i, l) \exp(-\alpha_t Y_i\{l\} h_t(x_i, l))$$

Methods used for choosing $\alpha_t$ and the implementation of the weak learning algorithm for text categorization are described after a description of the "AdaBoost.MR" algorithm.

AdaBoost.MR

Whereas AdaBoost.MH is designed to minimize Hamming loss, according to another embodiment of the present invention "AdaBoost.MR" is designed specifically to find a hypothesis that ranks labels in a manner with the correct labels placed at the top of the ranking.

With respect to a labeled observation $(x, Y)$, focus now on the relative ordering of a "crucial pair" $l_0, l_1$ for which $l_0 \notin Y$ and $l_1 \in Y$. A classification rule $f$ "misorders" the crucial pair $l_0, l_1$ if $f(x, l_0) \leq (x, l_0)$ so that $f$ fails to rank $l_1$ above $l_0$. The goal here is to find a function $f$ with a small number of misorderings so that the labels in $Y$ are ranked above the labels not in $Y$. Put another way, the goal is to minimize the average fraction of crucial pairs which are misordered, referred to herein as the empirical "ranking loss:"

$$\frac{1}{m} \sum_{i=1}^{m} \frac{1}{|Y_i||Y - Y_i|} |\{(l_0, l_1) \in (Y - Y_i) \times Y_i : f(x, l_1) \leq f(x, l_0)\}|$$

It can be assumed that $Y_i$ is never empty nor equal to all of $Y$ for any instance. If there are such instances in the training set, they can be discarded since there is no ranking problem to be solved and they do not carry any information.

AdaBoost.MR is as follows:

Given: $(x_1, Y_1), \ldots, (x_m, Y_m)$ where $x_i \in X$ and $Y_i \subseteq Y$ $$D_1(i, l_0, l_1) = \begin{cases} 1/(m \cdot |Y_i| \cdot |Y - Y_i|) & \text{if } l_0 \in Y_i \text{ and } l_1 \in Y_i \\ 0 & \text{else} \end{cases}$$

For $t = 1, \ldots, T$:
  Train weak learner using distribution $D_t$
  Get weak hypothesis $h_t: X \times Y \to \mathbb{R}$
  Choose $\alpha_t \in \mathbb{R}$
  Update:

$$D_{t+1}(i, l_0, l_1) = \frac{D_t(i, l_0, l_1) \exp(\frac{1}{2} \alpha_t(h_t(x_i, l_0) - h_t(x_i, l_1)))}{Z_t}$$

where $Z_t$ is a normalization factor, chosen so that $D_{t+1}$ will be a distribution. The final hypothesis is then output as follows:

$$f(x, l) = \sum_{t=1}^{T} \alpha_t h_t(x, l)$$

This embodiment of the present invention maintains a distribution $D_t$ over $\{1, \ldots, m\} \times Y \times Y$ and denotes the weight for instance $x_i$ and the pair $l_0, l_1$ by $D_t(i, l_0, l_1)$. This distribution is zero, however, except on the relevant triples $(i, l_0, l_1)$ for which $l_0, l_1$ is a crucial pair relative to $(x_i, Y_i)$.

As before, weak hypotheses have the form $h_t: X \times Y \to \mathbb{R}$; these are thought of as providing a ranking of labels as described above. The update rule, however, is a bit different. Let $l_0, l_1$ be a crucial pair relative to $(x_i, Y_i)$ and recall that $D_t$ is zero in all other cases. Assuming momentarily that $\alpha_t > 0$, this rule decreases the weight $D_t(i, l_0, l_1)$ if $h_t$ gives a correct ranking ($h_t(x_i, l_1) > h_t(x_i, l_0)$), and increases the weight otherwise.

As for the Hamming loss, it can be shown that the empirical ranking loss of this algorithm is at most:

$$\prod_{t=1}^{T} Z_t$$

Thus, as before, the goal in choosing $\alpha_t$ and $h_t$ should be minimization of:

$$Z_t = \sum_{i, l_0, l_1} D_t(i, l_0, l_1) \exp\left(\frac{1}{2} \alpha(h_t(x_i, l_0) - h_t(x_i, l_1))\right)$$

A description of the technique used for this purpose is provided in the next section.

The algorithm may be somewhat inefficient when there are many labels since, naively, $|Y_i| \cdot |Y - Y_i|$ weights are maintained for each training example $(x_i, Y_i)$, and each weight is updated on each round. Thus, the space complexity and time-per-second complexity can be as bad as $\theta(mk^2)$. In fact, the same algorithm can be implemented using only $\theta(mk)$ space and time per round. By the nature of the updates, it can be shown that weights $v_t$ only need to be maintained over $\{1, \ldots, m\} \times Y$. If $l_0, l_1$ is a crucial pair relative to $(x_i, Y_i)$, then:

$$D_t(i, l_0, l_1) = v_t(i, l_0) \cdot v_t(i, l_1)$$

at all times. Recall that $D_t$ is zero for all other triples $(i, l_0, l_1)$. An example of pseudocode for this embodiment of the present invention is as follows:

Given: $(x_1, Y_1), \ldots, (x_m, Y_m)$ where $x_i \in X$ and $Y_i \subseteq Y$
Initialize $v_1(i, l) = (m \cdot |Y_i| \cdot |Y - Y_i|)^{-1/2}$
For $t = 1, \ldots, T$:
  Train weak learner using distribution $D_t$
  Get weak hypothesis $h_t: X \times Y \to \mathbb{R}$
  Choose $\alpha_t \in \mathbb{R}$
  Update:

$$v_{t+1}(i, l) = \frac{v_t(i, l) \exp\left(-\frac{1}{2} \alpha_t Y_i\{l\} h_t(x_i, l)\right)}{\sqrt{Z_t}}$$

where:

$$Z_t = \sum_i \left[ \left( \sum_{l \in Y_i} v_t(i, l) \exp\left(\frac{1}{2} \alpha_t h_t(x_i, l)\right) \right) \left( \sum_{l \notin Y_i} v_t(i, l) \exp\left(-\frac{1}{2} \alpha_t h_t(x_i, l)\right) \right) \right]$$

The final hypothesis is output as follows:

$$f(x, l) = \sum_{t=1}^{T} \alpha_t h_t(x, l)$$

Note that all space requirements and all per-round computations are $\theta(mk)$, with the possible exception of the call to the weak learner. The next section demonstrates an implementation of a weak learner for text categorization that uses only mk weights. Thus the total time and space requirements of the classification algorithm are θ(mk).

Weak Hypotheses for Text Categorization

So far, the actual form and implementation of the weak learner, as well as the choice of the parameter $\alpha_t$, have been left unspecified. In this section, four implementations of weak learners, three for AdaBoost.MH and one for AdaBoost.MR, are described. A system for multi-label text categorization may be used with any of the four methods described below.

In every case, the weak hypotheses have the same basic form as a one-level decision tree. The test at the root of this tree is a simple check for the presence or absence of a term in the given document. All words and pairs of adjacent words are potential terms. In fact, the implementation is capable of using arbitrarily long (sparse) n-grams, but the examples here are restricted to words and word bigrams for comparison purposes.

Based only on the outcome of this test, the weak hypothesis outputs predictions and confidences that each label is associated with the document. For example, going back to the news categorization example, a possible term can be "White House," and the corresponding predictor may be:

If the term "White House" appears in the document then predict that the document belongs to "politics" with high confidence, to "business" with low confidence, and that it does not belong to "sports" with high confidence. If, on the other hand, the term does not appear in the document, then predict that it does not belong to any of the classes with low confidence.

Formally, denote a possible term by w, and let us define w∈x to mean that w occurs in document x. Based on the term, a weak hypothesis h may make predictions of the form:

$$h(x, l) = \begin{cases} c_0 l & \text{if } w \in x \\ c_1 l & \text{if } w \in x \end{cases}$$

where the $c_{jl}$'s are real numbers. The three weak learners described herein for AdaBoost.MH differ only with respect to possible restrictions which are placed on the values of these numbers.

The weak learners may search all possible terms. For each term, values $c_{jl}$ are chosen as described below, and a score is defined for the resulting weak hypothesis. Once all terms have been searched, the weak hypothesis with the lowest score is selected and returned by the weak learner.

For AdaBoost.MH, this score will always be an exact calculation of $Z_t$ as defined above with respect to AdaBoost.MH since minimization of $Z_t$ is a reasonable guiding principle in the design of the weak learning algorithm. For AdaBoost.MR, there is no analytical solution for the problem of minimizing $Z_t$. Instead, an approximation of $Z_t$ is used as described below.

AdaBoost.MH with Real-Valued Predictions

For the first weak learner according to an embodiment of the present invention, referred to herein as "real AdaBoost.MH," permit unrestricted real-valued predictions $c_{jl}$. With minimization of $Z_t$ in mind, the values $c_{jl}$ should be calculated as follows for a given term w: Let $X_0=\{x: w \in x\}$ and $X_1=\{x: w \in x\}$. Given the current distribution $D_t$, calculate the following for each possible label l, for j∈{0,1}, and for b∈{−1, +1}:

$$W_b^{jl} = \sum_{i=1}^{m} \sum_{l \in Y} D_t(i, l)[x_i \in X_j \wedge Y_i\{l\} = b]$$

For readability of notation, the subscripts +1 and −1 in $W_{+1}^{jl}$ and $W_{-1}^{jl}$ are abbreviated as $W_+^{jl}$ and $W_-^{jl}$, respectively. In words, $W_+^{jl}$ is the weight, with respect to the distribution $D_t$, of the documents in partition $X_j$ which are labeled by l, and $W_-^{jl}$ is the weight of the documents in partition $X_j$ which are not labeled by l.

$Z_t$ is minimized for a particular term by choosing:

$$c_{jl} = \frac{1}{2} \ln\left(\frac{W_+^{jl}}{W_-^{jl}}\right)$$

and by setting $\alpha_t=1$. These settings imply that:

$$Z_t = 2 \sum_{j \in \{0,1\}} \sum_{l \in Y} \sqrt{W_+^{jl} W_-^{jl}}$$

Thus, the term w may be selected for which this value of $Z_t$ is smallest.

In fact, it may be that $W_+^{jl}$ or $W_-^{jl}$ is very small, or even zero. In this case $c_{jl}$ will be very large or infinite in magnitude. In practice, such large predictions may cause numerical problems, and there may be theoretical reasons to suspect that large, overly confident predictions will increase the tendency to "over-fit." To limit the magnitudes of the predictions, "smoothed" values may be used instead according to an embodiment of the present invention:

$$c_{jl} = \frac{1}{2} \ln\left(\frac{W_+^{jl} + \varepsilon}{W_-^{jl} + \varepsilon}\right)$$

According to another embodiment of the present invention, ∈ is set to 1/mk. Since both $W_+^{jl}$ and $W_-^{jl}$ are bounded between 0 and 1, this has the effect of bounding $c_{jl}$ by approximately ½ ln(1/∈).

AdaBoost.MH with Real-Valued Predictions and Abstaining

The real AdaBoost.MH method assigns confidence values both when a term appears in a document and when it does not. Thus, it employs a tacit assumption that the absence of a term carries information about the possible classes a document may belong to. However, a definitive prediction may be difficult in the latter case and it would be better to "abstain" by assigning confidence values of zero to all the classes. In other words, the weak hypothesis could effectively say "I don't know" whenever the given term does not appear in a document. This embodiment of the present invention is referred to herein as "real abstaining AdaBoost.MH."

For a given term w, the weak learner chooses predictions $c_{1l}$ for documents which contain w, exactly as before. According to an embodiment of the present invention, these values are also smoothed as before. For the rest of the documents, the prediction values $c_{0l}$ are all set to zero. Hence, the term w has no influence on the classification if it does not appear in the document. As before, $\alpha_t$ is set to 1.

Let:

$$W_0 = \sum_{i:x_i \in X_0} D_t(i, l)$$

be the weight of all the document that do not contain w. Then it can be shown that:

$$Z_t = W_0 + 2\sum_{l \in Y} \sqrt{W_+^{1l} W_-^{1l}}$$

and, as before, on each round a term w is selected for which the value $Z_t$ is smallest.

One advantage of this weak learner over the first one is an improvement in the running time because only the documents that include a given term w are considered when computing $Z_t$. Since, typically, the number of documents that include a non-trivial term is only a small fraction of the training data, this may be faster than the previous one while maintaining comparable performance.

AdaBoost.MH with Discrete Predictions

The next weak learner forces the predictions $cj_l$ of the weak hypotheses to be either +1 or −1. This is the more standard setting in which predictions do not carry confidences. This embodiment of the present invention is referred to herein as "discrete AdaBoost.MH."

With this restriction on the range of the weak hypotheses, $Z_t$ can still be minimized for a given term w by setting:

$$c_{jl} = \text{sign}(W_+^{jl} - W_-^{jl})$$

which can be viewed as a (weighted) majority vote over examples in block $X_j$ for each label l.

Let:

$$r_t = \sum_{j \in \{0,1\}} \sum_{l \in Y} |W_+^{jl} - W_-^{jl}|$$

Then it can be shown that, for the purposes of minimizing $Z_t$:

$$\alpha_t = \frac{1}{2} \ln\left(\frac{1+r_t}{1-r_t}\right)$$

giving:

$$Z_t = \sqrt{1 - r_t^2}$$

AdaBoost.MR with Discrete Predictions

The following is a weak learner for AdaBoost.MR. As previously noted, the goal is to minimize $Z_t$. Unfortunately, the exact minimization of this quantity is not as straightforward as it was for AdaBoost.MH. Therefore only discrete predictions in {+1, −1} are considered, and an approximation, rather than an exact computation, for $Z_t$ is used as a score. This method is refered to herein as "discrete AdaBoost.MR."

For a given hypothesis h, let:

$$r_t = \frac{1}{2} \sum_{i,l_0,l_1} D_t(i, l_0, l_1)(h(x_i, l_1) - h(x_i, l_0))$$

Then, similar to the analysis for discrete AdaBoost.MH, it can be shown that $$Z_t \leq \sqrt{1 - r_t^2}$$

if:

$$\alpha_t = \frac{1}{2} \ln\left(\frac{1+r_t}{1-r_t}\right)$$

Since it is not known how to efficiently minimize $Z_t$ exactly, instead a weak hypothesis is found minimizes the upper bound $$\sqrt{1 - r_t^2} .$$

This upper bound is then used as a score in choosing the best weak hypothesis.

The quantity $r_t$ can be computed efficiently in terms of the weights $v_t$. Let:

$$d_t(i, l) = \frac{1}{2} v_t(i, l) \sum_{l':Y_i[l'] \neq Y_i[l]} v_t(i, l')$$

Then it can be shown that:

$$r_t = \sum_{i,l} d_t(i, l) Y_i\{l\} h(x_i, l)$$

Thus, for a particular term w:

$$c_{jl} = \text{sign}\left(\sum_{i:x_i \in X_j} d_t(i, l) Y_i\{l\}\right)$$

which gives:

$$r_t = \sum_{j \in \{0,1\}} \sum_{l \in Y} \left| \sum_{i:x_i \in X_j} d_t(i, l) Y_i\{l\} \right|$$

The term w is selected which maximizes this quantity, and corresponding predictions are assigned. The parameter $\alpha_t$ is define as before.

According to embodiments of the present invention, a multi-label text categorization system may be used with, for example, any of the four weak learner implementations described above.

Although various embodiments are specifically illustrated and described herein, it will be appreciated that modifications and variations of the present invention are covered by the above teachings and within the purview of the appended claims without departing from the spirit and intended scope of the invention. For example, although particular system architectures were used to illustrate the present invention, it can be appreciated that other architectures may be used instead. Similarly, although particular equations and algorithms have been illustrated, other equations and algorithms will also fall within the scope of the invention. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method of information categorization, comprising:
   assigning a weight to each information sample in a training set, the training set containing a plurality of information samples, each information sample having one or more associated labels selected from a plurality of possible labels, at least one information sample having more than one associated label;
   determining, using the weight assigned to each information sample, a base hypothesis that predicts which labels are associated with a given information sample;
   modifying the weight assigned to information samples in the training set based on the base hypothesis prediction for that information sample; and
   repeating said determining and modifying to generate a plurality of base hypotheses.

2. The method of claim 1, further comprising:
   combining the plurality of base hypotheses to create a combined hypothesis.

3. The method of claim 2, further comprising:
   receiving an un-categorized information sample; and
   categorizing the received information sample with one or more labels in accordance with the combined hypothesis.

4. The method of claim 3, wherein the information samples are documents.

5. The method of claim 4, wherein said receiving comprises:
   receiving a speech sample; and
   converting the received speech sample into an un-categorized document using speech recognition.

6. The method of claim 4, wherein said determination comprises evaluating words in each document to determine one or more words that predict the labels associated with a given document.

7. The method of claim 2, wherein the combined hypothesis evaluates an information sample in accordance each base hypothesis and categorizes the information sample based on the plurality of evaluation results.

8. The method of claim 2, wherein the combined hypothesis predicts which labels are associated with each information sample and which labels are not associated with each information sample.

9. The method of claim 8, wherein S represents a sequence of information samples in the training set $<(x_1, Y_1), \ldots, (x_m, Y_m)>$ such that each $x_i \in X$ and each $Y_i \subseteq$ a finite set of labels (Y), k represents the number of different possible labels and l represents a label, and wherein:
   said assigning comprises initializing distribution $D_1(i, l)$ to $1/(mk)$;

said determining, modifying and repeating comprise, for $t=1, \ldots, T$, determining the base hypothesis $h_t$: $X \times Y \to \mathbb{R}$ using distribution $D_t$, choosing $\alpha_1 \in \mathbb{R}$ and updating:

$$D_{t+1}(i, l) = \frac{D_t(i, l)\exp(-\alpha_t Y_i\{l\}h_t(x_i, l))}{Z_t}$$

wherein $Z_t$ is a normalization factor chosen such that $D_{t+1}$ is a distribution; and said combining the plurality (T) of base hypotheses comprises:

$$f(x, l) = \sum_{t=1}^{T} \alpha_t h_t(x, l)$$

wherein $f(x, l)$ is the combined hypothesis.

10. The method of claim 9, wherein said determining uses one of: real-valued predictions; real-valued predictions and abstaining; and discrete predictions.

11. The method of claim 2, wherein the combined hypothesis ranks labels associated with each information sample.

12. The method of claim 11, wherein S represents a sequence of information samples in the training set $<(x_1, Y_1), \ldots, (x_m, Y_m)>$ such that each $x_i \in X$ and each $Y_i \subseteq$ a finite set of labels (Y), k represents the number of different possible labels and l represents a label, and $$D_1(i, l_0, l_1) = \begin{cases} 1/(m \cdot |Y_i| \cdot |Y - Y_i|) & \text{if } l_0 \notin Y_i \text{ and } l_1 \in Y_i \\ 0 & \text{else} \end{cases}$$

wherein:

said determining, modifying and repeating comprise, for $t=1, \ldots, T$, determining the base hypothesis $h_t: X \times Y \to \mathbb{R}$ using distribution $D_t$, choosing $\alpha_t \to \mathbb{R}$ and updating:

$$D_{t+1}(i, l_0, l_1) = \frac{D_t(i, l_0, l_1)\exp(\frac{1}{2}\alpha_t(h_t(x_i, l_0) - h_t(x_i, l_1)))}{Z_t}$$

wherein $Z_t$ is a normalization factor chosen such that $D_{t+1}$ is a distribution; and said combining the plurality (T) of base hypotheses comprises:

$$f(x, l) = \sum_{t=1}^{T} \alpha_t h_t(x, l)$$

wherein $f(x, l)$ is the combined hypothesis.

13. The method of claim 11, wherein S represents a sequence of information samples in the training set $<(x_1, Y_1), \ldots, (x_m, Y_m)>$ such that each $x_i \in X$ and each $Y_i \subseteq$ a finite set of labels (Y), k represents the number of different possible labels and l represents a label, and wherein:

said assigning comprises initializing $v_1(i, l) = (m \cdot |Y_i| \cdot |Y - Y_i|)^{1/2}$;

said determining, modifying and repeating comprise, for t=1, . . . , T, determining the base hypothesis $h_t$: $X \times Y \rightarrow \mathbb{R}$ using distribution $D_t$, choosing $\alpha_t \in \mathbb{R}$ and updating:

$$v_{t+1}(i, l) = \frac{v_t(i, l)\exp\left(-\frac{1}{2}\alpha_t Y_i\{l\}h_t(x_i, l)\right)}{\sqrt{Z_t}}$$

where:

$$Z_t = \sum_i \left[\left(\sum_{l \notin Y_i} v_t(i, l)\exp\left(\frac{1}{2}\alpha_t h_t(\alpha_i, l)\right)\right)\left(\sum_{l \in Y_i} v_t(i, l)\exp\left(-\frac{1}{2}\alpha_t h_t(\alpha_i, l)\right)\right)\right]$$

and said combining the plurality (T) of base hypothesis comprises:

$$f(x, l) = \sum_{t=1}^{T} \alpha_t h_t(x, l)$$

wherein $f(x, l)$ is the combined hypothesis.

14. The method of claim 11, wherein said determining uses discrete predictions.

15. The method of claim 1, wherein each information sample in the training set is associated with a set of weights, each weight in the set of weights being associated with a label.

16. The method of claim 1, wherein a base hypothesis predicts whether or not each label is associated with an information sample.

17. The method of claim 1, wherein a base hypothesis predicts the likelihood that each label is associated with an information sample.

18. The method of claim 1, wherein a substantially equal weight is initially assigned to each information sample in the training set.

19. The method of claim 1, wherein said modifying comprises decreasing a weight assigned to an information sample, relative to other information samples, when the labels associated with that information sample are correctly predicted by a base hypothesis.

20. An information categorization apparatus, comprising:
a training set database including a plurality of information samples, each information sample being associated with one or more labels selected from a plurality of possible labels, at least one information sample being associated with more than one label; and
a processor system coupled to said training set database, said processor system being adapted to: (1) assign a weight to each information sample; (2) determine, using the weight assigned to each information sample, a base hypothesis to predict which labels are associated with a given information sample; (3) modify the weight assigned to each information sample in the training set based on the base hypothesis prediction for that information sample; (4) repeat said determining and modifying to generate a plurality of base hypotheses; and (5) combine the plurality of base hypotheses to create a combined hypothesis.

21. The apparatus of claim 20, further comprising:
an information sample input port coupled to said processor system;
wherein said processor system is further adapted to: (6) receive an un-categorized information sample through said an information sample input port; and (7) categorize the received information sample with one or more labels in accordance with the combined hypothesis.

22. An article of manufacture comprising a computer-readable medium having stored thereon instructions adapted to be executed by a processor, the instructions which, when executed, define a series of steps for document categorization comprising:
assigning a weight to each document in a training set, the training set containing a plurality of documents and associated labels;
determining a base hypothesis to predict which labels are associated with each document in the training set;
modifying the weight assigned to each document in the training set based on the base hypothesis predictions;
repeating said determining and modifying to generate a plurality of base hypotheses; and
combining the plurality of base hypotheses to create a combined hypothesis.

23. The article of claim 22, said series of steps further comprising:
receiving an un-categorized document; and
categorizing the received document with one or more labels in accordance with the combined hypothesis.

24. A method of document categorization, comprising:
assigning a weight to each document in a training set, the training set containing a plurality of documents having one or more associated labels;
determining, using the weight assigned to each document, a base hypothesis to predict which labels are associated with documents in the training set;
modifying the weight assigned to documents in the training set based on the base hypothesis predictions;
repeating said determining and modifying to generate a plurality of base hypotheses;
combining the plurality of base hypotheses to create a combined hypothesis;
receiving an un-categorized document associated with a processing request;
categorizing the received document with one or more labels in accordance with the combined hypothesis; and
performing the requested process based on said categorizing.

* * * * *